Figure 7:
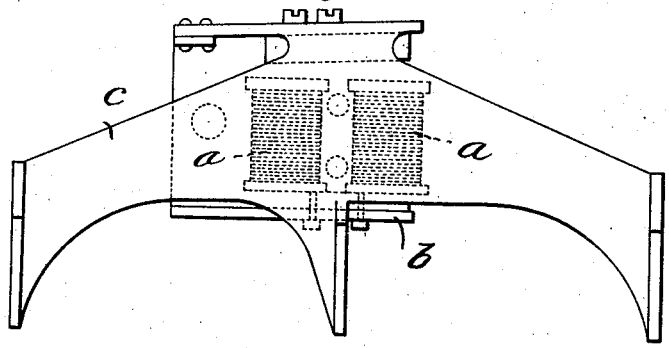
Figure 8:
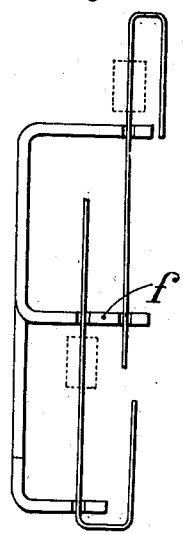
Figure 9:
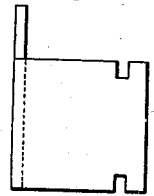
Figure 10:
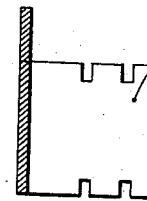
Figure 11:
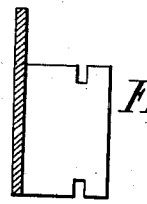

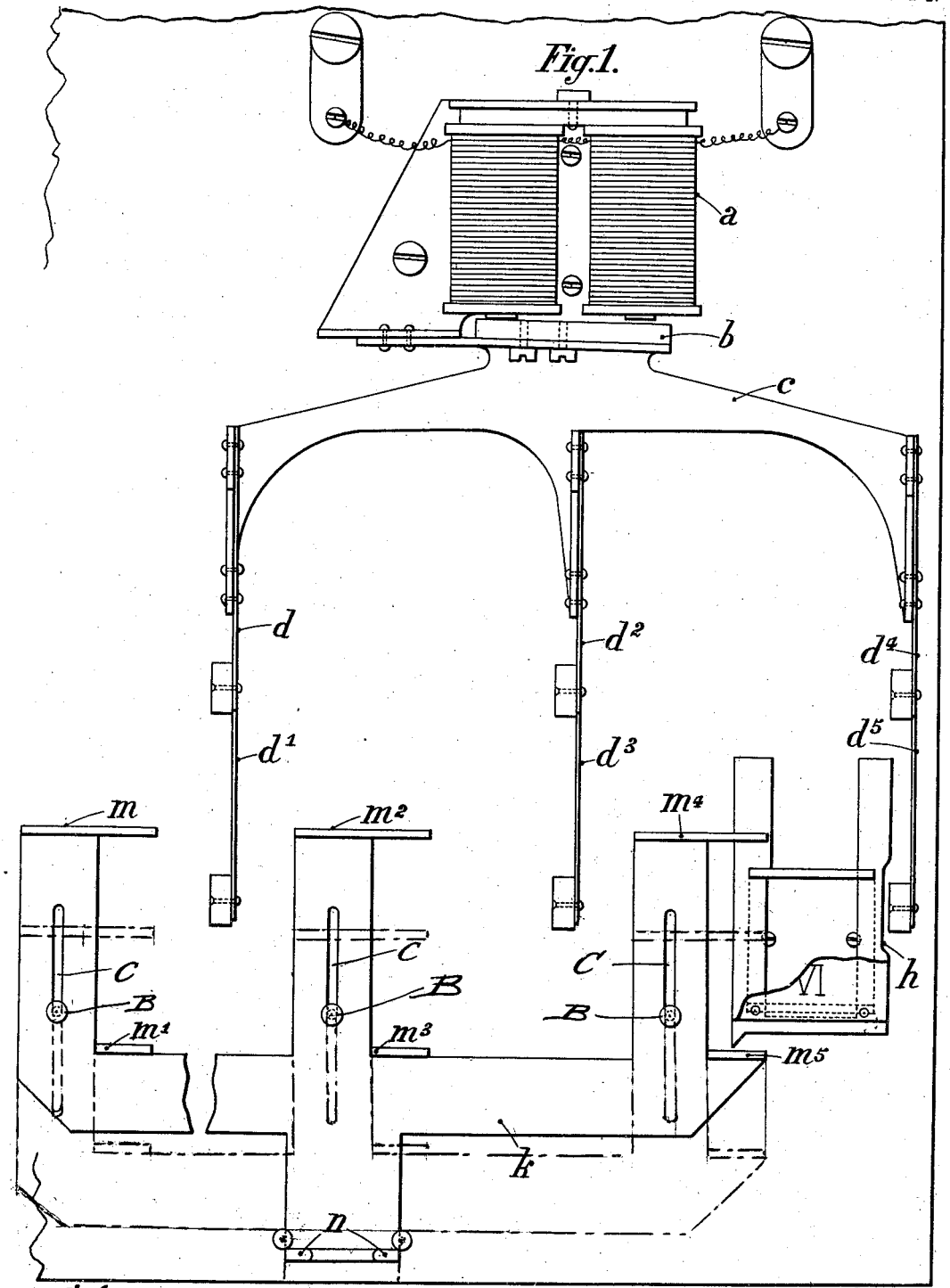

No. 849,919. PATENTED APR. 9, 1907.
A. PERRIN.
TRANSMISSION OF SIGNALS.
APPLICATION FILED MAY 23, 1904.
6 SHEETS—SHEET 2.
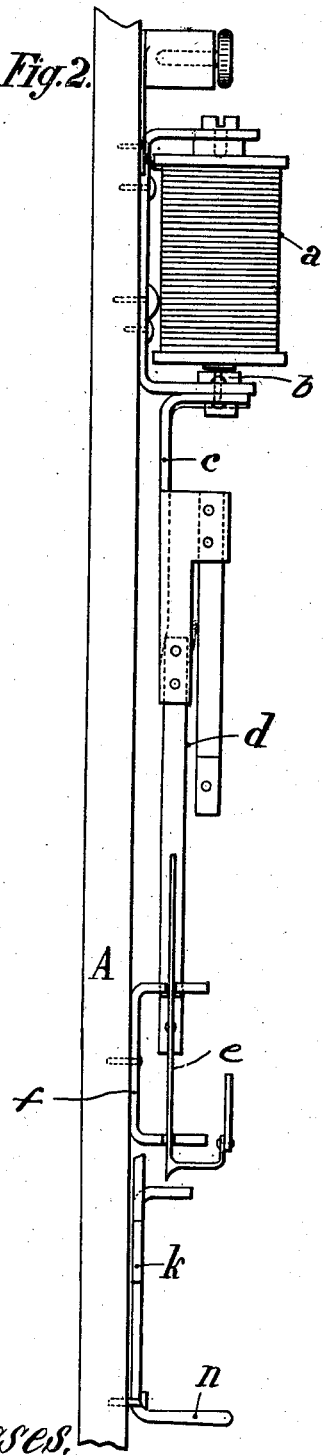
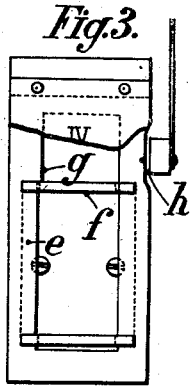
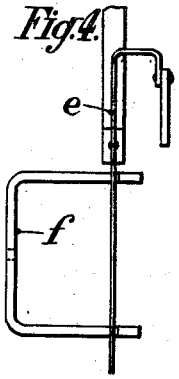
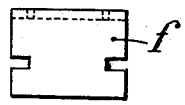
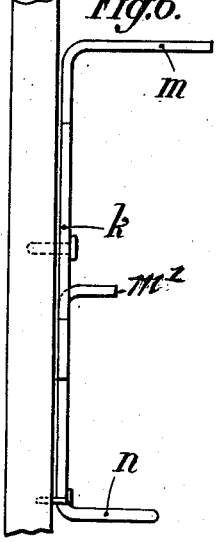
Witnesses,
William T. Jones.
Robert Cruitt.
Inventor,
Alfred Perrin,
By James L. Norris.
Atty.

No. 849,919.

PATENTED APR. 9, 1907.

A. PERRIN.
TRANSMISSION OF SIGNALS.
APPLICATION FILED MAY 23, 1904.

6 SHEETS—SHEET 3.

Witnesses,
William T. Jones.
Robt Everett

Inventor,
Alfred Perrin,
By James L. Norris
Atty.

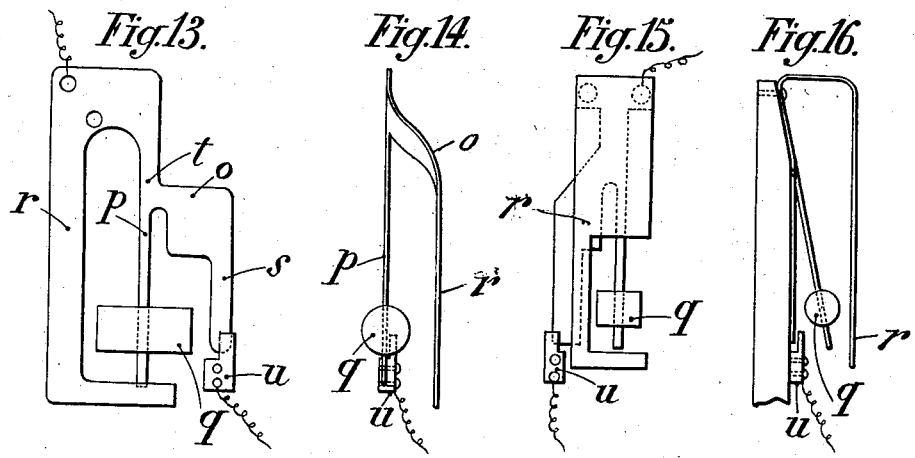
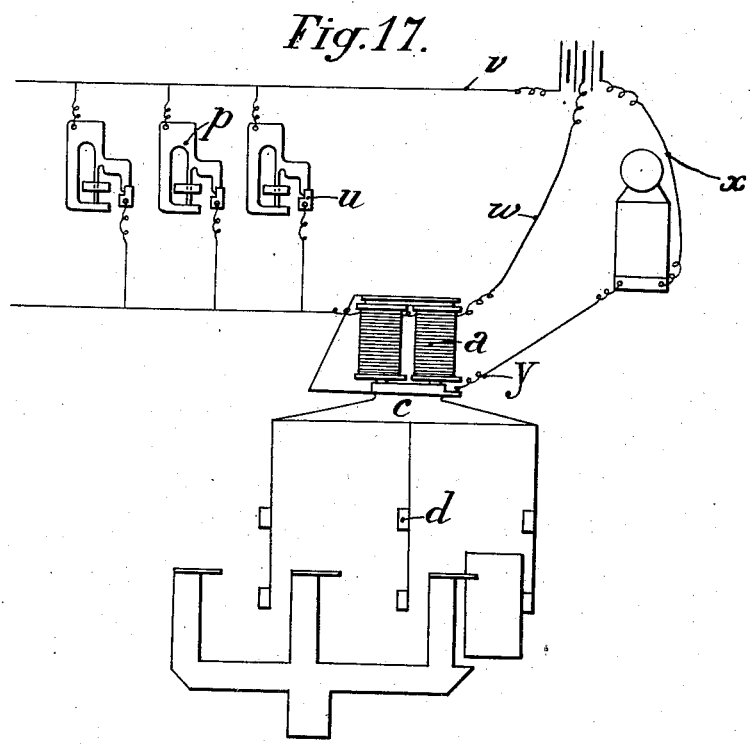

No. 849,919. PATENTED APR. 9, 1907.
A. PERRIN.
TRANSMISSION OF SIGNALS.
APPLICATION FILED MAY 23, 1904.

6 SHEETS—SHEET 5.

Witnesses: Inventor
Alfred Perrin
By James L. Norris
Attys.

No. 849,919. PATENTED APR. 9, 1907.
A. PERRIN.
TRANSMISSION OF SIGNALS.
APPLICATION FILED MAY 23, 1904.

UNITED STATES PATENT OFFICE.

ALFRED PERRIN, OF GRENOBLE, FRANCE.

TRANSMISSION OF SIGNALS.

No. 849,919. Specification of Letters Patent. Patented April 9, 1907.

Application filed May 23, 1904. Serial No. 209,406.

*To all whom it may concern:*

Be it known that I, ALFRED PERRIN, engineer, a citizen of the French Republic, residing at Grenoble, Isère, France, have invented certain new and useful Improvements in the Transmission of Signals, of which the following is a specification.

This invention has for its object a new system of transmission of signals from or to any distances, and is based on the following principle.

A system constituted by a piece which is set in oscillation and insures an electrical contact for each oscillation is said to be synchronous with an ordinary pendulum or with a pendulum consisting of an elastic blade loaded at its free end, when the interval between two electrical contacts corresponds to the duration of a double period of oscillation of the pendulum. If a simple pendulum or an elastic pendulum be subjected to electrical contacts that are synchronous with its period of oscillation, the amplitude of its oscillations increases to such an extent that it becomes sufficient to produce mechanical effects if the mass of the pendulum is sufficiently large. These mechanical effects can be amplified by any known means—such, for instance, as an electromagnet acting as a relay. If, on the contrary, the system be asynchronous, the amplitude does not exceed a small value and no mechanical effect is obtained. If, therefore, several pendulums are subjected to a system of electrical contacts, the pendulum which is synchronous with the electrical-contacts system will alone oscillate with an amplitude sufficient to produce mechanical work.

In order to transmit signals in accordance with this principle, it is sufficient to have at the sending-stations a certain number of pendulums whose periods of oscillations are perceptibly different and to arrange at the receiving-station the same number of pendulums, each of which corresponds to a like pendulum at the sending-station. On acting on one of the pendulums at the sending-station a suitable arrangement breaks and makes a circuit which produces at regular intervals attractions on the pendulums at the receiving-office. The pendulum of the receiving-station which is synchronous with the corresponding pendulum at the sending-station will then be the only one that will have an amplitude of oscillation sufficient to produce the required mechanical effect, such as the release of a shield on an indicator-board.

The movement of the pendulums in the receiving-station may be obtained by one or more electromagnets acting on a frame carrying the pendulums. In the case of very slow oscillating pendulums the movement may be produced by expansible wires heated by the current and acting on the frame carrying the pendulums. The receiving-station may be operated by wireless telegraphy, provided the vibration of the coherer is very rapid relatively to the periods of oscillations of the pendulums used.

This invention will be readily understood by referring to the accompanying drawings, in which—

Figure 18:
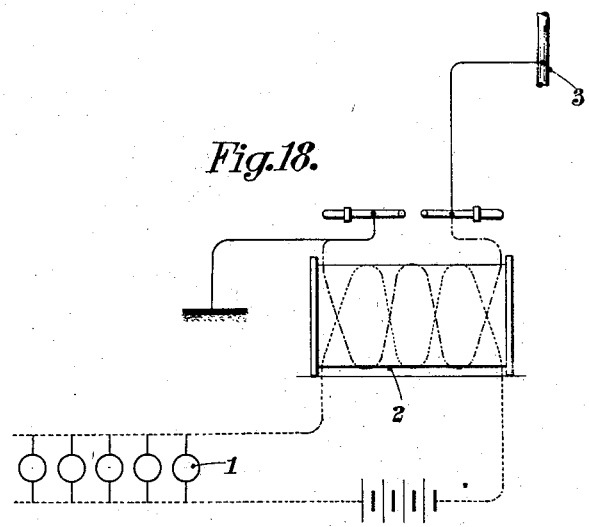
Figure 19:
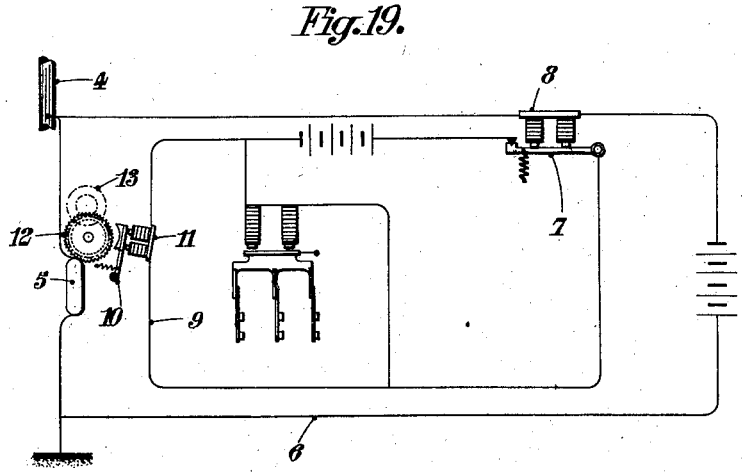
Figure 20:
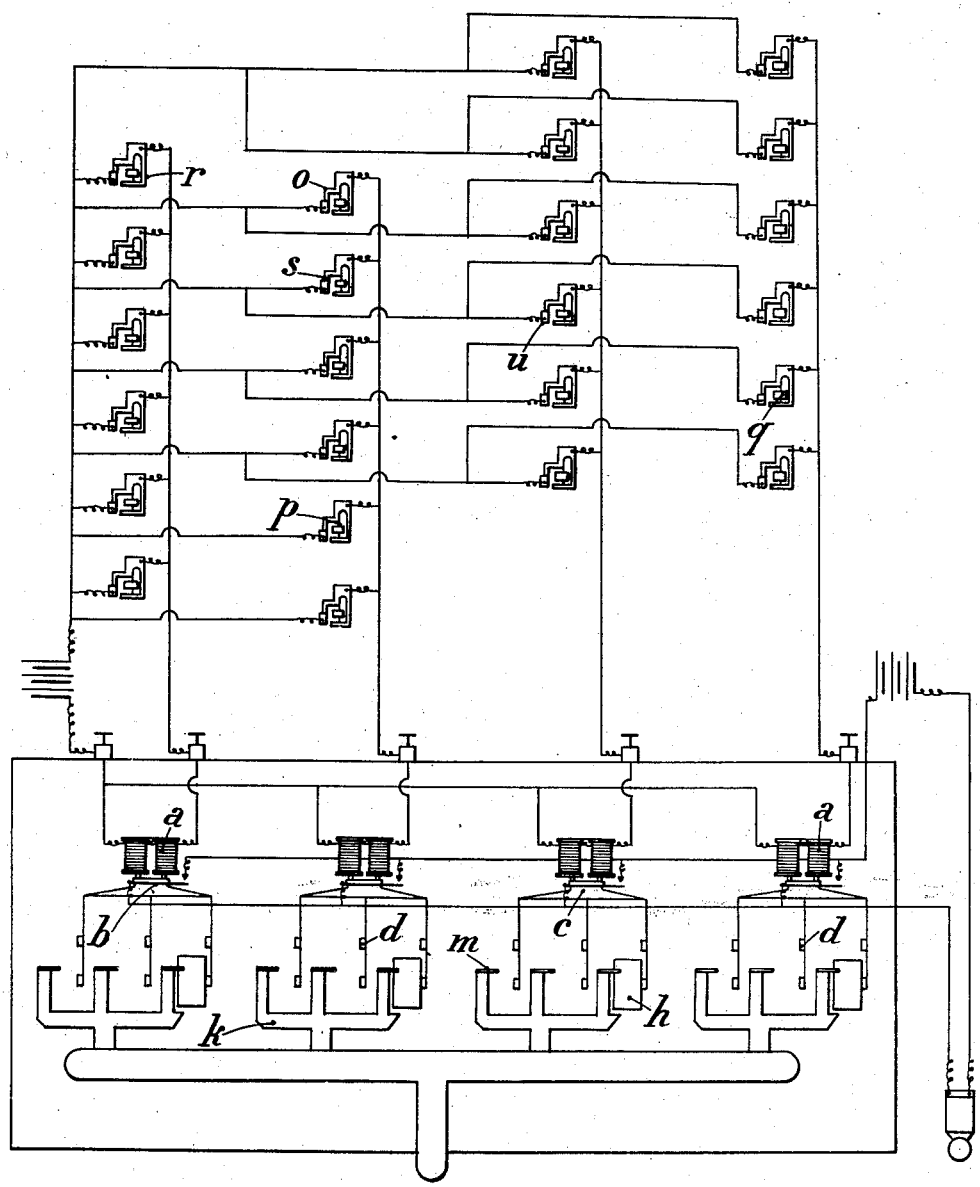

Figure 1 shows by way of example a front view of the receiving apparatus of an apartment-annunciator. Fig. 2 is an end view. Figs. 3, 4, 5, and 6 are details. Figs. 7, 8, 9, 10, 11, and 12 are modifications. Figs. 13 and 14 show an elevation and an end view of the sending apparatus. Figs. 15 and 16 show an elevation and an end view of a modification of the sending apparatus, while Fig. 17 is a diagram of the circuit connections. Fig. 18 is a diagrammatic view of a sending-station for wireless transmission. Fig. 19 is a diagrammatic view of a receiving-station for the application of the system to wireless telegraphy. Fig. 20 is a diagram of the circuit connections or joined apparatuses embodying the features of the invention.

The receiving apparatus, Figs. 1 and 2, comprises an electromagnet $a$, the armature $b$ of which carries a frame $c$, to which are attached elastic pendulums $d$, $d'$, $d^2$, $d^3$, $d^4$, and $d^5$, which are arranged in pairs on each of the three branches of the frame, as shown by Fig. 1 of the drawings.

The frame has the shape of an inverted W, each branch of which carries pendulums which are so arranged that the movement of the framing under the attraction of the electromagnet takes place in the plane of oscillation of the pendulums.

In order to decrease the height of the apparatus, the electromagnet $a$ might be arranged below the armature $b$, as shown in Fig. 7.

The elastic pendulum $d$, set in motion by the corresponding synchronous pendulum of the sending-station, causes a number-plate to tilt or drop.

The number-plates, which may be arranged so as to slide, Figs. 3, 4, and 5, consist of a small plate of sheet metal $e$ capable of sliding in a support $f$. This small plate carries a projection $g$, resting on the support $f$ and preventing the small plate from dropping. When the pendulum vibrates, the small plate will be repelled toward the left and drop. The small plate is also provided with a notch $h$ opposite the hammer of the pendulum. When the small plate has dropped, the notch is no longer opposite the hammer of the pendulum, which is thereby held stationary.

Figs. 8, 9, 10, and 11 show a modification comprising a single support for two number-plates.

Figure 12:
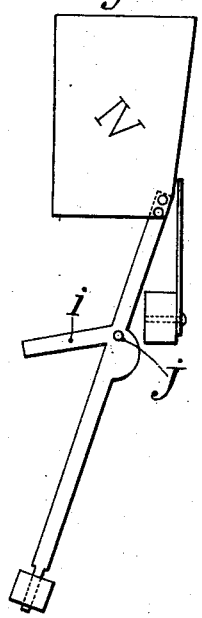

Number-plates capable of being tilted may also be used, Fig. 12. When at rest, they are in a state of unstable equilibrium and the least vibration causes them to tilt over. An arm $i$ serves to raise them again, while an eccentric $j$ stops the oscillations of the pendulum when the number-plate is tilted. The number-plates are raised again by a kind of fork $k$, Figs. 1, 2, and 6, which is shown in the drawings as being at the top of its upstroke. The fork $k$ is used for receiving the number-plates which fall by the action of the respective pendulums coöperating therewith. When at rest, the said fork $k$ is in the position shown in dotted lines in Fig. 1. When a number-plate has fallen or dropped, the operator or person who received the signal grasps the handle $n$ of the fork and raises the latter in the position shown in full lines in Fig. 1. The fork is provided with branches, as will be hereinafter set forth, corresponding to the various number-plates, and the branch corresponding to the plate which has fallen acts upon the said plate and brings it into normal position. In Fig. 5 of the drawings the number-plate corresponding to the pendulum $d$ only has been shown in order to facilitate a clear understanding of the drawings and the invention; but it is to be understood that each pendulum is supplied with a corresponding number-plate. This fork comes down again by virtue of its own gravity when the number-plates have been put back in their places and the fork is no longer acted on. This fork is provided with as many branches as there are number-plates. As the frame carries its pendulums, there are accordingly six number-plates, and the fork $k$ is provided with six branches $m$, $m'$, $m^2$, $m^3$, $m^4$, and $m^5$, which each correspond to a number-plate. The fork $k$ slides on the plate A, carrying pins B, engaged in grooves C of the fork. By raising the fork $k$ in the position shown by Fig. 1 and acting on the pendulum-rod $p$ the branches $m$, $m'$, $m^2$, $m^3$, $m^4$, and $m^5$ act, respectively, on the number-plates which have fallen and raise them. When the number-plates are raised, the fork is released, and falls to normal position by its own weight. Each branch raises the dropped number-plate corresponding to it.

As regards the number-plates shown in Figs. 3 and 5, these are raised by the branch acting on the lower left-hand corner, so that they are tilted slightly to the right and permit of the projection $g$ engaging with the notch $f$. To raise again the fork, the handle $n$ thereof and a fixed knob (not shown in the drawings) are held between the thumb and index-finger and brought close together. The transmission apparatus at the sending-station, Figs. 13, 14, 15, and 16, consists each of a piece of steel $o$, cut out and stamped so as to form therein, first, a pendulum-rod $p$, to which is fixed the bob or hammer $q$; second, a releasing-spring $r$, which causes the hammer $q$ to vibrate when pressure is exerted at a suitable point thereof, and, third, a lever $s$, intended to strike against a contact so as to make and break a circuit. This lever $s$ is caused to participate in the oscillations of the pendulum by the narrow part $t$ and also amplifies the displacement of the part $t$. A wire is attached to the steel plate $o$ and also to the contact $u$, as clearly shown by Figs. 13, 14, 15, and 16. It is advisable to give to the support of the transmission apparatus a slight elevation toward the center of the narrow part $t$ and below it. It will thus be possible by pressing on the spring $r$ to slightly raise the lever $s$ so that the contact is made so long as the transmission apparatus is being operated regularly, when the oscillations of the pendulum are of small amplitude.

For the call-bell of the annunciator an ordinary bell with interrupter may be used. In this case the bell is included in a special circuit, as shown in Fig. 17.

A wire $v$ starts from the positive pole of the battery and is connected by shunt-circuits, including the transmission apparatus of the sending-station to the electromagnet of the receiving-station. Another wire $w$ connects one of the negative poles of the battery to the electromagnet $a$ and frame $c$. A third wire $x$ in series with the bell runs from the last negative plate of the battery to the contact $y$, against which the frame $c$ strikes when it is attracted by the electromagnet, thereby closing the circuit of the bell and causing the bell to ring.

A slight difference between the sending and receiving pendulums is of no importance. It is possible if a great number of numbers are required—say twenty-four—to join together four apparatus comprising each six pendulums, as shown by Fig. 20. It will therefore suffice to have four outgoing wires and one return-wire—in all five or six wires, according to the connections of the bell, instead of the twenty-seven wires now used in connection with the ordinary annunciators. This arrangement has many advantages as regards its simplicity of construction and the small number of wires and electromagnets required.

The apparatus may be used in connection with wireless telegraphy.

In the sending-station the operation of keys 1 causes a current to pass into the primark circuit of the coil 2. (See Figs. 18 and 19.) Through the medium of Hertzian radiations, by means of the rods 3 and 4, the coherer 5 operates as a conducting medium and causes the current to pass therethrough and establish the circuit 6. Such passage of the current and the establishment of the circuit specified actuates the electromagnet 8 and causes the armature 7 to be attracted thereto. This attraction of the armature to the electromagnet closes the circuit 9 and sets up an operation of the signaling system. At the same time the armature 10 of the electromagnet 11 is attracted to the latter and ceases to act as a brake on the toothed wheel 12. This toothed wheel is operated by suitable clockwork 13 and when free to rotate strikes the coherer and obstructs the conductivity of the latter.

Having now particularly described and ascertained the nature of the said invention and in what manner the same is to be performed, I declare that what I claim is—

A method of transmitting mechanical signals consisting in causing one frame carrying different pendulums at a receiving-station to be oscillated by pendulums synchronous to the first pendulums and situated at sending-stations, each pendulum of the receiving-station oscillating with the synchronous corresponding pendulum of a sending-station.

In testimony whereof I have hereunto set my hand in presence of two subscribing witnesses.

ALFRED PERRIN.

Witnesses:
 JOHN GILLEAUL,
 PAUL FRANZ MOUNIA.